United States Patent
Luo

(10) Patent No.: US 9,772,760 B2
(45) Date of Patent: Sep. 26, 2017

(54) BRIGHTNESS ADJUSTMENT METHOD AND DEVICE AND ELECTRONIC DEVICE

(71) Applicant: Smartisan Digital Co., Ltd., Chaoyang District, Beijing (CN)

(72) Inventor: Yonghao Luo, Beijing (CN)

(73) Assignee: Smartisan Digital Co., Ltd., Beijing (CN)

( * ) Notice: Subject to any disclaimer, the term of this patent is extended or adjusted under 35 U.S.C. 154(b) by 30 days.

(21) Appl. No.: 14/781,111

(22) PCT Filed: Dec. 31, 2013

(86) PCT No.: PCT/CN2013/091033
§ 371 (c)(1),
(2) Date: Sep. 29, 2015

(87) PCT Pub. No.: WO2014/161363
PCT Pub. Date: Oct. 9, 2014

(65) Prior Publication Data
US 2016/0054907 A1    Feb. 25, 2016

(30) Foreign Application Priority Data
Apr. 3, 2013    (CN) .......................... 2013 1 0116204

(51) Int. Cl.
*G06F 3/0362*    (2013.01)
*G06F 3/048*    (2013.01)
(Continued)

(52) U.S. Cl.
CPC ........ *G06F 3/04847* (2013.01); *G06F 3/0481* (2013.01); *G06F 3/0488* (2013.01);
(Continued)

(58) Field of Classification Search
CPC ........ G06F 1/1692; G06F 3/017; G06F 3/048; G06F 3/0481; G06F 3/0482;
(Continued)

(56) References Cited

U.S. PATENT DOCUMENTS

2004/0214612 A1* 10/2004 Park .................... H04M 1/0212
                                                                       455/566
2004/0227741 A1* 11/2004 Koda ...................... G06F 3/017
                                                                       345/183
(Continued)

FOREIGN PATENT DOCUMENTS

CN    101470575 A    7/2009
CN    102232290 A    11/2011
(Continued)

OTHER PUBLICATIONS

The State Intellectual Property Office of People's Republic of China, Chinese Office Action for Application No. 201310116204.7, mailed Nov. 11, 2015.
(Continued)

*Primary Examiner* — Michael J Eurice
(74) *Attorney, Agent, or Firm* — Honigman Miller Schwartz and Cohn LLP; Matthew H. Szalach; Jonathan P. O'Brien

(57) ABSTRACT

A brightness adjustment method and device and an electronic device are provided. The method comprises: detecting a click of a user on a designated physical key; if the click is detected, displaying a designated panel on a touch sensitive display, wherein the designated panel comprises a brightness adjustment panel of the touch sensitive display; and adjusting the brightness of the touch sensitive display in accordance with a gesture operation of the user on the brightness adjustment panel.

15 Claims, 2 Drawing Sheets

(51) Int. Cl.
*G06F 3/0487* (2013.01)
*G06F 3/0488* (2013.01)
*G06F 3/0484* (2013.01)
*G06F 3/0481* (2013.01)
*G06F 3/01* (2006.01)
*H04M 1/23* (2006.01)
*G06F 3/0489* (2013.01)
*G06F 3/0482* (2013.01)
*G06F 1/16* (2006.01)

(52) U.S. Cl.
CPC ........ *G06F 3/04883* (2013.01); *G06F 1/1692* (2013.01); *G06F 3/017* (2013.01); *G06F 3/048* (2013.01); *G06F 3/0482* (2013.01); *G06F 3/04897* (2013.01); *G06F 2203/0381* (2013.01); *G06F 2203/04105* (2013.01); *G06F 2203/04808* (2013.01); *H04M 1/233* (2013.01)

(58) Field of Classification Search
CPC ............... G06F 3/04847; G06F 3/0488; G06F 3/04883; G06F 3/04897; G06F 2203/0381; G06F 2203/04105; G06F 2203/04808; H04M 1/233
See application file for complete search history.

(56) References Cited

U.S. PATENT DOCUMENTS

| | | | | |
|---|---|---|---|---|
| 2006/0119572 A1* | 6/2006 | Lanier | ................... | G06F 1/1601 345/156 |
| 2006/0139312 A1* | 6/2006 | Sinclair, II | ............ | G06F 3/0481 345/156 |
| 2006/0238517 A1* | 10/2006 | King | ..................... | G06F 1/1626 345/173 |
| 2008/0266257 A1* | 10/2008 | Chiang | ................. | G06F 1/1626 345/163 |
| 2009/0106682 A1 | 4/2009 | Abdelhadi et al. | | |
| 2009/0143141 A1* | 6/2009 | Wells | ...................... | G07F 17/32 463/37 |
| 2009/0209293 A1* | 8/2009 | Louch | ................. | H04M 1/6041 455/566 |
| 2010/0125816 A1* | 5/2010 | Bezos | ................... | G06F 1/1626 715/863 |
| 2010/0295781 A1* | 11/2010 | Alameh | ............... | G06F 3/0346 345/158 |
| 2011/0109619 A1* | 5/2011 | Yoo | ......................... | G06T 17/00 345/419 |
| 2011/0291988 A1* | 12/2011 | Bamji | ................... | G06F 3/0428 345/175 |
| 2012/0169583 A1* | 7/2012 | Rippel | .................... | G06F 3/013 345/156 |
| 2012/0235921 A1* | 9/2012 | Laubach | ............... | G06F 3/0238 345/172 |
| 2012/0290950 A1* | 11/2012 | Rapaport | ................ | H04L 51/32 715/753 |
| 2012/0308204 A1* | 12/2012 | Hwang | .............. | G06F 3/04847 386/241 |
| 2012/0319989 A1* | 12/2012 | Argiro | ................... | G06F 3/038 345/174 |
| 2013/0063380 A1* | 3/2013 | Wang | ................. | G06F 3/04883 345/173 |
| 2013/0076595 A1* | 3/2013 | Sirpal | .................. | G06F 3/1438 345/1.3 |
| 2013/0082946 A1* | 4/2013 | Park | ...................... | G06F 3/04847 345/173 |
| 2013/0169579 A1* | 7/2013 | Havnor | ............... | G06F 3/04883 345/173 |
| 2013/0229387 A1* | 9/2013 | Chen | ....................... | G06F 3/042 345/175 |
| 2013/0321271 A1* | 12/2013 | Bychkov | ................ | G06F 3/017 345/158 |
| 2013/0332892 A1* | 12/2013 | Matsuki | ................ | G06F 3/0488 715/863 |
| 2014/0078318 A1* | 3/2014 | Alameh | ................ | G06F 3/0304 348/207.99 |
| 2014/0155031 A1* | 6/2014 | Lee | .......................... | G06F 21/35 455/411 |
| 2014/0157210 A1* | 6/2014 | Katz | ....................... | G06F 3/017 715/863 |
| 2014/0165000 A1* | 6/2014 | Fleizach | ............... | H04M 19/04 715/810 |
| 2014/0168100 A1* | 6/2014 | Argiro | .................. | G06F 3/0416 345/173 |
| 2014/0173482 A1* | 6/2014 | Hicks | .................... | G06F 3/0483 715/769 |
| 2014/0201689 A1* | 7/2014 | Bedikian | ................. | G06F 3/011 715/863 |
| 2014/0232671 A1* | 8/2014 | Chaudhri | ............... | G06F 9/4443 345/173 |
| 2014/0267103 A1* | 9/2014 | Chaudhri | ................. | G09G 5/14 345/173 |
| 2014/0292396 A1* | 10/2014 | Bruwer | ................ | H03K 17/955 327/517 |
| 2014/0362274 A1* | 12/2014 | Christie | ................ | G06F 3/0488 348/333.11 |
| 2014/0365912 A1* | 12/2014 | Shaw | ................... | G06F 3/04817 715/748 |
| 2015/0062052 A1* | 3/2015 | Bernstein | .............. | G06F 3/0416 345/173 |
| 2015/0067495 A1* | 3/2015 | Bernstein | ................ | G06F 3/016 715/702 |
| 2015/0067513 A1* | 3/2015 | Zambetti | ............... | G06F 3/0482 715/716 |
| 2015/0138155 A1* | 5/2015 | Bernstein | .............. | G06F 3/0412 345/174 |
| 2015/0149956 A1* | 5/2015 | Kempinski | ............. | G06F 3/017 715/784 |

FOREIGN PATENT DOCUMENTS

| | | |
|---|---|---|
| CN | 102693037 A | 9/2012 |
| CN | 102903336 A | 1/2013 |
| CN | 103197889 A | 7/2013 |
| JP | 2010177994 A | 8/2010 |

OTHER PUBLICATIONS

International Searching Authority, State Intellectual Property Office of the P.R. China, International Search Report for PCT/CN2013/091033, mailed Apr. 3, 2014.

\* cited by examiner

BRIGHTNESS ADJUSTMENT METHOD AND DEVICE AND ELECTRONIC DEVICE

CROSS-REFERENCE TO RELATED APPLICATIONS

This application is a national phase application of International Application No. PCT/CN2013/091033, titled "BRIGHTNESS ADJUSTMENT METHOD AND DEVICE AND ELECTRONIC DEVICE", filed on Dec. 31, 2013, which claims priority to Chinese Patent Application No. 201310116204.7 filed with the Chinese Patent Office on Apr. 3, 2013, titled "BRIGHTNESS ADJUSTMENT METHOD AND DEVICE AND ELECTRONIC DEVICE", the disclosures of which are hereby incorporated by reference in their entirety.

TECHNICAL FIELD

The disclosure relates to the field of information inputting for electronic devices, and in particular to a brightness adjustment method, an apparatus and an electronic device thereof.

BACKGROUND

Many electronic devices such as cell phone, PDA (Personal Digital Assistant), notebook computer, tablet computer and media player adopt a touch sensitive display (also referred to as touch-control screen or touch screen) to display images and texts, and provide a user interface for interaction between users and the devices. Meanwhile, most of the electronic devices provide a function of screen brightness adjustment, so that the user may adjust the screen brightness of the display.

The inventor has found in implementing the invention that, the screen brightness adjustment option in a conventional electronic device is generally set in a secondary menu, or in a pull-down menu at the top of the touch screen, or in a control on the desktop. When the user wants to adjust the screen brightness while operating a current application, the user has to quit the application, and open a system setting menu or return to the desktop to perform the brightness adjustment. In the screen brightness adjustment method of conventional technology, the process of man-machine interaction is complex, which causes low response speed and low efficiency. In addition, it requires to login again after the quit for many applications, which badly affects user experience.

SUMMARY

In view of this, the objective of the embodiments of the disclosure is to provide a brightness adjustment method, an apparatus and an electronic device thereof, in order to solve the problem of low response speed and low efficiency in screen brightness adjustment for electronic devices.

In one aspect, a method for adjusting brightness of an electronic device is provided. The electronic device includes a touch sensitive display and a designated physical button. The method includes:

detecting a click from a user on the designated physical button;

displaying a designated panel on the touch sensitive display if the click is detected, wherein the designated panel comprises a brightness adjustment panel of the touch sensitive display; and adjusting the brightness of the touch sensitive display based on gesture operation of the user on the brightness adjustment panel.

Preferably, displaying the designated panel on the touch sensitive display includes:

querying current brightness information of the touch sensitive display, and displaying a brightness adjustment bar of the touch sensitive display on the touch sensitive display based on the current brightness information.

Preferably, the designated physical button includes a volume adjustment button.

Preferably, the designated panel further includes a volume adjustment panel; and the method further includes, after displaying the designated panel on the touch sensitive display:

adjusting volume of the electronic device, based on gesture operation of the user on the volume adjustment panel and/or operation of the user on the volume adjustment button.

Preferably, the method further includes, if the click is detected:

notifying the current application to process the click; and executing the subsequent step.

Preferably, the method further includes, after displaying the designated panel on the touch sensitive display:

closing the designated panel if no operation of the user is detected in a designated duration.

In another aspect, an apparatus for adjusting brightness of an electronic device is further provided. The electronic device includes a touch sensitive display and a designated physical button. The apparatus includes:

an input detection unit, configured to detect a click from a user on the designated physical button, and if the click is detected, trigger a panel display unit;

the panel display unit, configured to display a designated panel on the touch sensitive display, where the designated panel includes a brightness adjustment panel of the touch sensitive display; and a brightness adjustment unit, configured to adjust the brightness of the touch sensitive display based on gesture operation of the user on the brightness adjustment panel.

Preferably, in a case that the panel display unit is configured to display the designated panel on the touch sensitive display, it is configured to query current brightness information of the touch sensitive display, and display a brightness adjustment bar of the touch sensitive display on the touch sensitive display based on the current brightness information.

Preferably, the designated physical button comprises a volume adjustment button.

Preferably, the designated panel further comprises a volume adjustment panel; and the apparatus further includes:

a volume adjustment unit, configured to adjust volume of the electronic device based on gesture operation of the user on the volume adjustment panel and/or operation of the user on the volume adjustment button.

Preferably, the apparatus further includes:

a current application processing unit, configured to, before triggering the panel display unit, notify the current application to process the click, and if the current application does not process the click, trigger the panel display unit.

Preferably, the apparatus further includes:

a panel closing unit, configured to, close the designated panel if no operation of the user is detected in a designated duration.

In yet another aspect, an electronic device is provided. The electronic device includes a touch sensitive display, a designated physical button and a processor.

The processor is configured to detect a click from a user on the designated physical button; display a designated panel on the touch sensitive display if the click is detected, where the designated panel comprises a brightness adjustment panel of the touch sensitive display; and adjust the brightness of the touch sensitive display based on gesture operation of the user on the brightness adjustment panel.

Preferably, in a case that the processor is configured to display the designated panel on the touch sensitive display, the processor may be configured to:

query current brightness information of the touch sensitive display, and display a brightness adjustment bar of the touch sensitive display on the touch sensitive display based on the current brightness information.

Preferably, the designated physical button includes a volume adjustment button.

Preferably, the designated panel further includes a volume adjustment panel; and the processor is further configured to, after the designated panel is displayed on the touch sensitive display, adjust volume of the electronic device based on gesture operation of the user on the volume adjustment panel and/or operation of the user on the volume adjustment button.

Preferably, the processor is further configured to, if the click is detected, notify a current application to process the click, and if the current application does not process the click, execute a subsequent step.

Preferably, the processor is further configured to, after the designated panel is displayed on the touch sensitive display, close the designated panel if no operation of the user is detected in a designated duration.

According to the embodiments, through the setting of the designated physical button on the electronic device, especially the setting of the common volume adjustment button, the user may open the screen brightness adjustment panel via clicking on the physical button, e.g., the user may adjust the screen brightness while clicking on the volume adjustment button to adjust the volume. The response speed of the device is greatly improved when the user needs to adjust the screen brightness, and the inconvenience of quitting the current application to adjust the brightness is avoided to some extent.

BRIEF DESCRIPTION OF THE DRAWINGS

In order to illustrate the technical solutions according to the embodiments of the disclosure more clearly, the drawings to be used in the description of the embodiments are described briefly hereinafter. Apparently, the drawings described hereinafter are just embodiments of the disclosure, other drawings may be obtained by those skilled in the art according to those drawings without creative effort.

DETAILED DESCRIPTION OF THE EMBODIMENTS

The technical solution according to the embodiments of the disclosure will be described clearly and completely in conjunction with the drawings hereinafter. Apparently, the described embodiments are just a few rather than all of the embodiments of the disclosure. All other embodiments obtained by those skilled in the art based on the embodiments of the disclosure without any creative work will fall within the protection scope of the disclosure.

To understand the invention comprehensively, many specific details are mentioned in the following description. Those skilled in the art should comprehend that the invention may be implemented without these specific details. In other embodiments, well known methods, processes, components and circuits are not described in detail, to avoid unnecessary obscure of the embodiments.

A First Embodiment

Figure 1:
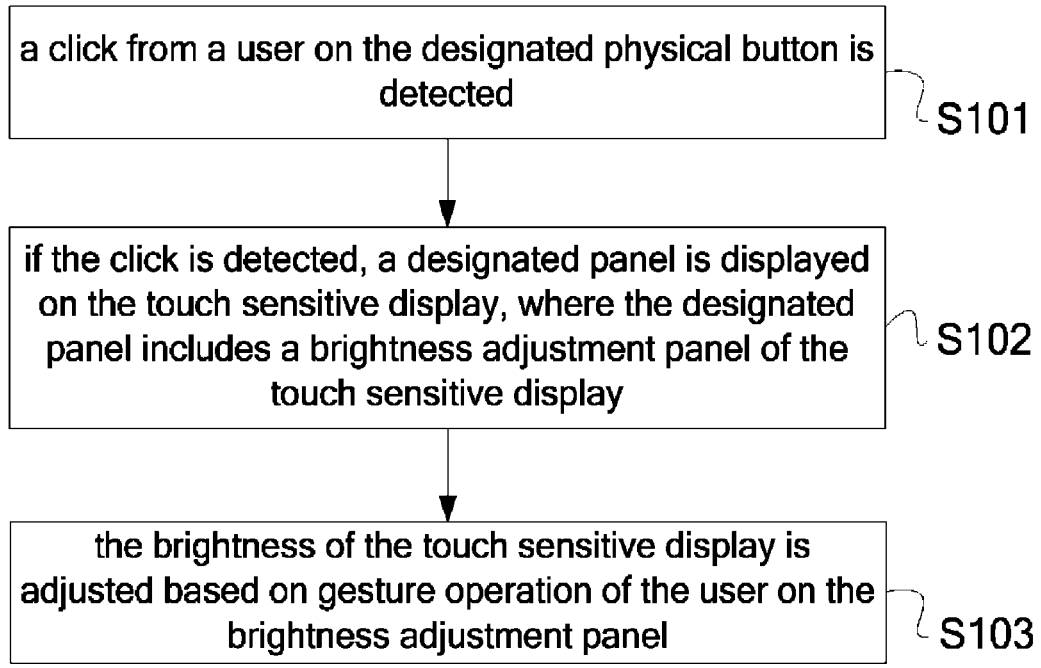
FIG. 1 is a flow chart of a method according to a first embodiment of the disclosure.

A flow chart of a method according to the first embodiment of the disclosure is shown FIG. 1. A brightness adjustment method is provided, applied to an electronic device such as cell phones, PDAs (Personal Digital Assistants), notebook computers, tablet computers and media players. The electronic device includes a touch sensitive display and a designated physical button. The method includes steps S101-S103.

In step S101, a click from a user on the designated physical button is detected. The designated physical button may be any physical button on the electronic device. In the embodiment or other specific embodiments of the invention, preferably, the designated physical button may include a volume adjustment button.

The electronic device generally has a function of playing audio or outputting audio, accordingly the physical button for volume adjustment, i.e., the volume adjustment button is provided. Taking the cell phone as an example, the volume adjustment button usually includes two separated "add" and "subtract" keys or a single key (referred to as "add and subtract" button). The click on the "add and subtract" button defaults to volume adjustment, through which related volume of the system or application may be adjusted. The function of the "add and subtract" button may be redefined. Thus, the "add and subtract" button may be added the function of brightness adjustment, or the "add and subtract" button is a multifunction button for simultaneous volume and screen brightness adjustment.

In step S102, if the click is detected, a designated panel is displayed on the touch sensitive display, where the designated panel includes a brightness adjustment panel of the touch sensitive display. When the user clicks on the designated physical button, e.g., presses one of the add and subtract keys, the brightness adjustment panel for adjusting the brightness of the display is displayed on the display, so that the user may perform brightness adjustment. A virtual button only appears at a specific location at a specific time in a specific application, and cannot be activated at any time, thus its response level is low. Thereby, the physical button instead of virtual button is adopted in the invention, and compared to the virtual button, the physical button does not vary with the applications, has a fixed location, may be controlled at any time, and possesses a higher response level.

In the embodiment or other embodiments of the invention, preferably, the step that the designated panel is displayed on the touch sensitive display (where the designated panel includes a brightness adjustment panel of the touch sensitive display), includes: querying current brightness information of the touch sensitive display, and displaying a brightness adjustment bar of the touch sensitive display on the touch sensitive display based on the brightness information. The brightness adjustment panel may be a brightness adjustment bar, horizontally or vertically, able to be slid back and forth in the corresponding direction and display current brightness values or brightness percentages. In addition, in some embodiments of the invention, the brightness adjustment panel may be in other forms, such as a dial with figures, an input box for numbers, and a select box for numbers and so on, and these forms which may be used here do not depart from the spirit and protection scope of the invention.

In step S103, the brightness of the touch sensitive display is adjusted based on gesture operation of the user on the brightness adjustment panel. Specifically, the brightness value which the user intends to input may be obtained based on user gestures on the touch screen such as dragging, sliding, toggling, and clicking, thus the brightness of the touch sensitive display is adjusted.

In addition, to take into account user's habit and ensure that the user may still use the volume adjustment button to adjust the volume, the conventional volume adjustment option may be also activated by clicking the volume adjustment button, i.e., panels for volume adjustment and brightness adjustment may pop up simultaneously. That is, in the embodiment or other specific embodiments of the invention, preferably, the designated panel may further include a volume adjustment panel; accordingly, the method may further include, after displaying the designated panel on the touch sensitive display:

adjusting the volume of the electronic device, based on gesture operation of the user on the volume adjustment panel and/or operation of the user on the volume adjustment button. That is, the user may adjust the volume through clicking the "add and subtract" button or adjust the volume through the touch screen according to his habit. Alternatively, the function of adjusting the volume through clicking the "add and subtract" button may be kept unchanged, but the volume adjustment panel is not activated, and only the brightness adjustment panel is activated.

In addition, in the embodiment or other specific embodiments of the invention, preferably, the method may further include, if the click is detected:

notifying the current application to process the click; and
if the current application does not process the click, proceeding to a subsequent step.

The volume adjustment button is redefined in many programs, e.g., the "add and subtract" button may be given a function of zoom in and out on the map in a navigation program, thus requirements of the current application may be met first. In a case that the application does not respond to the click on the designated physical button, the subsequent step such as displaying the brightness adjustment panel is executed.

In implementation, when the user presses the volume adjustment button, the system notifies the current application to respond to it first. If the current application does not respond to it, the system notifies a Audio Service to adjust the system volume by default, and the Audio Service notifies a UI (user interface) service to display the volume adjustment panel on the interface. When the volume adjustment panel is initialized, the volume adjustment bar is displayed. Meanwhile the current screen brightness is queried from system settings, and the brightness adjustment bar is displayed beside the volume adjustment bar based on the brightness value provided by the system. The user may change the position of the brightness adjustment button through a touch operation. Accordingly the brightness adjustment bar changes the current brightness of the display through a Power Service (power service) based on the position of the adjustment button, and a new brightness value is stored in the system settings at the same time.

In the embodiment or other specific embodiments of the invention, preferably, the method may include, after displaying the designated panel on the touch sensitive display:

if no operation of the user is detected in a designated duration, the designated panel is closed. A volume slider and a brightness slider may disappear automatically if no operation is performed on the screen in a few seconds.

A Second Embodiment

Figure 2:
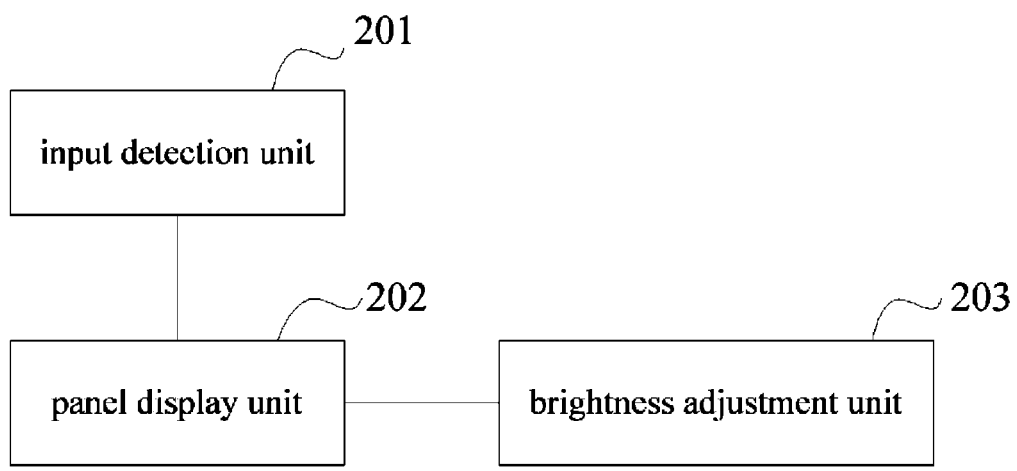
FIG. 2 is a schematic diagram of an apparatus according to a second embodiment of the disclosure.

FIG. 2 is a schematic diagram of an apparatus according to the second embodiment of the disclosure. Corresponding to the first embodiment, a brightness adjustment apparatus is provided in the embodiment, applied to an electronic device. The electronic device includes a touch sensitive display and a designated physical button. The apparatus includes:

an input detection unit 201, configured to detect a click from a user on the designated physical button, and if the click is detected, trigger a panel display unit 202;

the panel display unit 202, configured to display a designated panel on the touch sensitive display, where the designated panel includes a brightness adjustment panel of the touch sensitive display; and a brightness adjustment unit 203, configured to adjust the brightness of the touch sensitive display based on gesture operation of the user on the brightness adjustment panel.

Preferably, in a case that the panel display unit 202 is configured to display the designated panel on the touch sensitive display, it is configured to query current brightness information of the touch sensitive display, and display a brightness adjustment bar of the touch sensitive display on the touch sensitive display based on the brightness information.

Preferably, the designated physical button includes a volume adjustment button.

Preferably, the designated panel further includes a volume adjustment panel; and
and the apparatus further includes:

a volume adjustment unit 204, configured to adjust volume of the electronic device based on gestures operation of the user on the volume adjustment panel and/or operation of the user on the volume adjustment button.

Preferably, the device further includes:

a current application processing unit 205, configured to, before triggering the panel display unit, notify the current application to process the click, and if the current application does not process the click, trigger the panel display unit 202.

Preferably, the apparatus further includes:

a panel closing unit 206, configured to, close the designated panel if no operation of the user is detected in a designated duration.

The apparatus embodiment basically corresponds to the method embodiment, thus for relevance, partial description in the method embodiment may be referred to. The described apparatus embodiment is illustrative, where the unit described as a separate part may be or may not be physically separate, components shown as the units may be or may not be a physical unit, i.e., the components may be located at one place, or may distribute on a plurality of network units. A part of or all of the modules may be chosen based on actual needs to achieve the objective of the embodiment. Those skilled in the art may understand and implement the embodiment without creative effort.

A Third Embodiment

Figure 3:
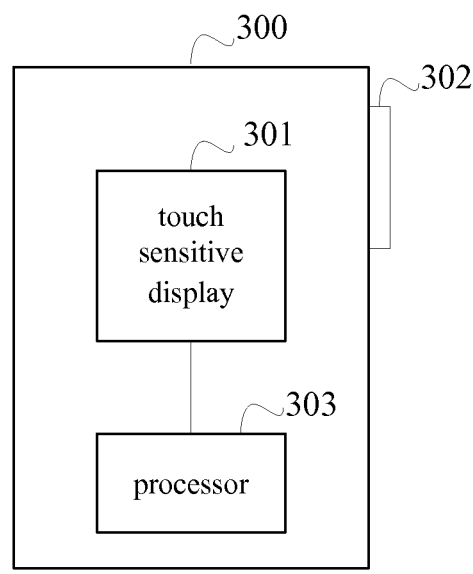
FIG. 3 is a schematic diagram of a device according to a third embodiment of the disclosure.

FIG. 3 is a schematic diagram of a device according to the third embodiment of the disclosure. Corresponding to the first and second embodiment, an electronic device 300 is provided. The electronic device 300 includes a touch sensitive display 301, a designated physical button 302 and a processor 303.

The processor 303 is configured to detect a click from a user on the designated physical button; display a designated panel on the touch sensitive display if the click is detected, where the designated panel includes a brightness adjustment panel of the touch sensitive display; and adjust the brightness of the touch sensitive display based on gesture operation of the user on the brightness adjustment panel.

Preferably, in a case that the processor 303 is configured to display the designated panel on the touch sensitive display 301, the processor may be configured to query current brightness information of the touch sensitive display 301, and display a brightness adjustment bar of the touch sensitive display 301 on the touch sensitive display 301 based on the brightness information.

Preferably, the designated physical button 302 includes a volume adjustment button.

Preferably, the designated panel further includes a volume adjustment panel; and the processor 303 is further configured to, after the designated panel is displayed on the touch sensitive display 301, adjust volume of the electronic device 300 based on gesture operation of the user on the volume adjustment panel and/or operation of the user on the volume adjustment button.

Preferably, the processor 303 is further configured to, if the click is detected, notify a current application to process the click, and if the current application does not process the click, execute a subsequent process.

Preferably, the processor 303 is further configured to, after the designated panel is displayed on the touch sensitive display 301, close the designated panel if no operation of the user is detected in a designated duration.

The device embodiment basically corresponds to the method embodiment, thus for relevance, partial description in the method embodiment may be referred to. The described device embodiment is illustrative, where the unit described as a separate part may be or may not be physically separate, components shown as the units may be or may not be a physical unit, i.e., the components may be located at one place, or may distribute on a plurality of network units. A part of or all of the modules may be chosen based on actual needs to achieve the objective of the embodiment. Those skilled in the art may understand and implement the embodiment without creative effort.

The invention may be described in general context of a computer executable instruction executed by a computer, such as program module. Generally, the program module includes a routine, a program, an object, a component, and a data structure performing a specific task or implementing a specific abstract data type. The invention may also be practiced in distributed computing environment, where a remote processing equipment connected through communication network executes the task. In the distributed computing environment, the program module may be located in local and remote computer storage medium, including a storage device.

Those skilled in the art may understand that, all of or a part of the steps implementing the above method may be accomplished through related hardware instructed by the program, and the program may be stored in a computer readable storage medium, such as ROM, RAM, disk and compact disc.

It should be noted that, in the disclosure, relational terms such as the first and the second are only used to distinguish an entity or operation from another entity or operation, and it does not necessarily require or imply that there are such actual relationships or sequences among the entities or operations. Furthermore, the term 'include', 'comprise' or any other variant thereof intends to cover a non-exclusive inclusion, thus allows a process, a method, an object or an apparatus including a series of elements to include not only the elements, but also other elements not clearly set out, or to include intrinsic elements of the process, method, object or apparatus. In a case that there are no more restrictions, elements defined by the statement 'include a . . . ' do not exclude the case that other similar elements exist in the process, method, object or apparatus including the elements.

The described embodiments are merely preferred embodiments of the invention, and are not intended to limit the scope of protection of the invention. The principle and implementation of the invention is illustrated through specific example, and the description of the embodiments is to help understand the method and core concept of the invention; for those skilled in the art, changes may be developed in the implementation and application range based on the spirit of the invention. In conclusion, the disclosure should not be understood as limitation to the invention. Any change, equivalent replacement, modification, etc., without departing from the spirit and principle of the disclosure should fall in the scope of protection of the disclosure.

What is claimed is:

1. A method for adjusting brightness of an electronic device, the electronic device comprising a touch sensitive display and a volume adjustment button, wherein the method comprises:
    detecting a click from a user on the volume adjustment button;
    displaying a designated panel on the touch sensitive display if the click is detected, wherein the designated panel comprises a brightness adjustment panel of the touch sensitive display; and
    adjusting the brightness of the touch sensitive display based on operation of the user on the volume adjustment button.

2. The method according to claim 1, wherein displaying the designated panel on the touch sensitive display comprises:
    querying current brightness information of the touch sensitive display, and
    displaying a brightness adjustment bar of the touch sensitive display on the touch sensitive display based on the current brightness information.

3. The method according to claim 1,
    wherein the designated panel further comprises a volume adjustment panel; and
    wherein the method further comprises, after displaying the designated panel on the touch sensitive display:
    adjusting volume of the electronic device, based on gesture operation of the user on the volume adjustment panel and/or operation of the user on the volume adjustment button.

4. The method according to claim 1, further comprising, if the click is detected:
    notifying a current application to process the click; and
    executing the step of displaying the designated panel on the touch sensitive display if the current application does not process the click.

5. The method according to claim 1, further comprising, after displaying the designated panel on the touch sensitive display:

closing the designated panel if no operation of the user is detected in a designated duration.

6. An apparatus for adjusting brightness of an electronic device, the electronic device comprising a touch sensitive display and a volume adjustment button, wherein the apparatus comprises:
   an input detection unit, configured to detect a click from a user on the volume adjustment button, and if the click is detected, trigger a panel display unit;
   the panel display unit, configured to display a designated panel on the touch sensitive display, wherein the designated panel includes a brightness adjustment panel of the touch sensitive display; and
   a brightness adjustment unit, configured to adjust the brightness of the touch sensitive display based on operation of the user on the volume adjustment button.

7. The apparatus according to claim 6,
wherein in a case that the panel display unit is configured to display the designated panel on the touch sensitive display, it is configured to query current brightness information of the touch sensitive display, and display a brightness adjustment bar of the touch sensitive display on the touch sensitive display based on the current brightness information.

8. The apparatus according to claim 6,
wherein the designated panel further comprises a volume adjustment panel; and
wherein the apparatus further comprises:
a volume adjustment unit, configured to adjust volume of the electronic device based on gesture operation of the user on the volume adjustment panel and/or operation of the user on the volume adjustment button.

9. The apparatus according to claim 6, further comprising:
a current application processing unit, configured to:
before triggering the panel display unit, notify the current application to process the click, and
if the current application does not process the click, trigger the panel display unit.

10. The apparatus according to claim 6, further comprising:
a panel closing unit, configured to, close the designated panel if no operation of the user is detected in a designated duration.

11. An electronic device, comprising a touch sensitive display, a volume adjustment button and a processor, wherein the processor is configured to:
   detect a click from a user on the volume adjustment button;
   display a designated panel on the touch sensitive display if the click is detected, wherein the designated panel comprises a brightness adjustment panel of the touch sensitive display; and
   adjust the brightness of the touch sensitive display based on operation of the user on the volume adjustment button.

12. The device according to claim 11, wherein in a case that the processor is configured to display the designated panel on the touch sensitive display, the processor is configured to:
   query current brightness information of the touch sensitive display, and
   display a brightness adjustment bar of the touch sensitive display on the touch sensitive display based on the current brightness information.

13. The device according to claim 11,
wherein the designated panel further comprises a volume adjustment panel; and
wherein the processor is further configured to, after the designated panel is displayed on the touch sensitive display, adjust volume of the electronic device based on gesture operation of the user on the volume adjustment panel and/or operation of the user on the volume adjustment button.

14. The device according to claim 11, wherein the processor is further configured to, if the click is detected, notify a current application to process the click, and if the current application does not process the click, execute the operation of displaying the designated panel on the touch sensitive display.

15. The device according to claim 11, wherein the processor is further configured to, after the designated panel is displayed on the touch sensitive display, close the designated panel if no operation of the user is detected in a designated duration.

* * * * *